(12) United States Patent
Sunyich

(10) Patent No.: US 8,093,775 B2
(45) Date of Patent: Jan. 10, 2012

(54) MAGNETIC ROTOR ASSEMBLY

(76) Inventor: Steven L. Sunyich, St. George, UT (US)

(*) Notice: Subject to any disclaimer, the term of this patent is extended or adjusted under 35 U.S.C. 154(b) by 130 days.

(21) Appl. No.: 12/555,614

(22) Filed: Sep. 8, 2009

(65) Prior Publication Data

US 2010/0156224 A1  Jun. 24, 2010

Related U.S. Application Data

(60) Provisional application No. 61/097,198, filed on Sep. 15, 2008.

(51) Int. Cl.
*H02K 21/00* (2006.01)
(52) U.S. Cl. ........................... 310/152; 310/114
(58) Field of Classification Search ............. 310/114, 310/46, 152, 261.1
See application file for complete search history.

(56) References Cited

U.S. PATENT DOCUMENTS

| | | | | |
|---|---|---|---|---|
| 4,064,442 A * | 12/1977 | Garron | ........................ | 318/400.3 |
| 4,132,911 A * | 1/1979 | Garron | ........................ | 310/46 |
| 6,281,611 B1 * | 8/2001 | Chen et al. | ........................ | 310/171 |
| 6,369,479 B1 * | 4/2002 | Ochiai et al. | ........................ | 310/156.51 |
| 6,518,681 B2 * | 2/2003 | Ogino | ........................ | 310/12.12 |
| 2002/0175580 A1 * | 11/2002 | Ogino | ........................ | 310/152 |
| 2003/0227228 A1 * | 12/2003 | Cherciu | ........................ | 310/152 |

FOREIGN PATENT DOCUMENTS

WO  90/10337  9/1990

* cited by examiner

*Primary Examiner* — Thanh Lam
(74) *Attorney, Agent, or Firm* — TraskBritt, P.C.

(57) ABSTRACT

A device for inducing the rotation of a plurality of rotors by use of magnetically charged materials includes at least a pair of rotors rotatably mounted. Each rotor includes at least one outwardly extending element having magnetic material attached to the opposing ends of the element. The elements of the two rotors are positioned co-planarly with respect to one another, such that each element of one rotor is paired with a corresponding co-planarly positioned element of the other rotor. The elements are positioned sufficiently proximate to one another such that the polarity of one element's end may interact with the polarity of its paired element of the other rotor to induce a rotation of one or both of the two rotors.

12 Claims, 3 Drawing Sheets

MAGNETIC ROTOR ASSEMBLY

CROSS REFERENCE TO RELATED APPLICATIONS

This application claims the benefit under Title 35, United States Code, §119(e) of U.S. Provisional Application No. 61/097,198 filed Sep. 15, 2008, the entirety of which is incorporated herein by reference.

FIELD OF THE INVENTION

This invention relates to devices which utilize magnetic materials to induce the movement of structures. More specifically, this invention is directed to a device for inducing the rotation of a rotor by use of magnetic materials.

STATEMENT OF THE ART

Structures which utilize magnetic charged materials for purposes of inducing the rotation of a rotor are known. For example, such a structure is disclosed in the PCT application published under publication number WO 90/10337. Such structures typically include a rotatably mounted rotor having magnetically charged materials positioned on one or more locations thereon. The rotor is positioned proximate a plurality of stationarily fixed magnetic materials with some type of shielding materials positioned intermediate the magnetic materials on the rotor and the stationarily fixed magnetic materials. Once the shielding materials are removed from their intermediate position, the interaction of the two sets of magnetic materials operates to induce a rotation of the rotor.

SUMMARY OF THE INVENTION

A magnetic rotor device of the instant invention includes a first rotor which is mechanically associated with a first support structure. The first rotor is adapted for rotation about a first axis of rotation associated with the first rotor. At least one first elongate, magnetically charged element and preferably a plurality of first elongate, magnetically charged elements is secured to the first rotor. In those embodiments having a plurality of first elements the first elements are spacedly arranged apart from one another along a length of the first rotor. Each of the first elements is fitted with a quantity of magnetically charged material on each of its two opposing ends. In preferred constructions the magnetically charged material on one end of a given first element possesses a first polarity while the opposing end of the given first element has a second polarity, the first polarity being opposite from that of the second polarity.

The invention further includes a second rotor is mechanically associated with a second support structure. The second rotor is adapted for rotation about a second axis of rotation associated with the second rotor. At least one second elongate, magnetically charged element and preferably a plurality of second elongate, magnetically charged elements is associated with the second rotor. In those embodiments having a plurality of second elements the second elements are positioned spacedly from one another along a length of the second rotor. Each of the second elements is fitted with a quantity of magnetically charged material on each of is two opposing ends. The polarity of the material fitted on one end of the second element is preferably opposite from the polarity of the material fitted to an opposing end of the second element.

The first rotor is positioned proximate the second rotor. Each of the first elements of the first rotor is preferably positioned in a co-planar, or substantially co-planar relationship with a corresponding second element of the second rotor. The two rotors are positioned sufficiently proximate to one another such that the magnetic materials found on the ends of a first element and a corresponding second element may interact with another to create a repelling force between the two elements of sufficient magnitude to induce the rotation of at least one of the two rotors relative to its respective axis of rotation.

One or both of the rotors may be associated with corresponding structures for transferring kinetic energy from the rotor to that structure.

DETAILED DESCRIPTION OF THE ILLUSTRATED EMBODIMENT

Figure 1:
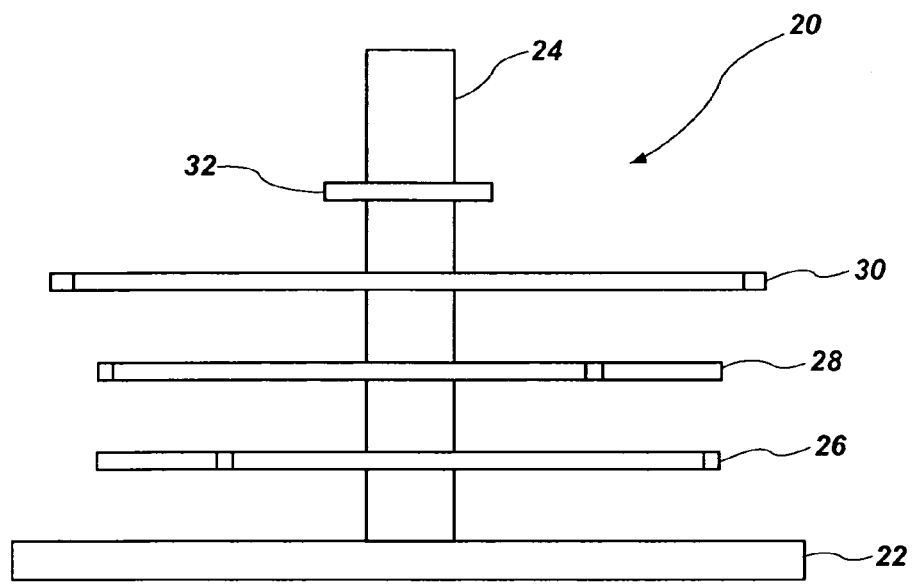
FIG. 1 is an elevational side view of a rotor of the instant invention illustrating a plurality of elongate elements arranged horizontally along a height of the rotor.

As shown in FIG. 1 a first rotor 20 of the invention is formed by a vertically positioned central shaft 24 in association with a circular base element 22. The shaft 24 is a cylindrical element having a constant diameter over its height. The longitudinal axis of the shaft 24 is oriented perpendicular to the horizon. It should be appreciated that the drawing figures illustrate the rotor being positioned in a vertically upright orientation. The invention is not limited to such a vertical orientation. Instead, the longitudinal axis of the rotor may be oriented in any desired orientation, e.g. horizontally, or at an angle to the horizontal. The base element 22 may be fixedly secured to the shaft 24 whereby a rotation of the shaft 24 results in a corresponding rotation of the base element 22 as well. Alternatively, the shaft may be rotatably secured to the base element 222 such that the shaft is permitted to rotate about its longitudinal axis while the base element 22 remains stationary.

A plurality of elongate first elements 26, 28, 30 and 32 are shown fixedly positioned on the shaft 24, to form the first rotor 20. Each of the first elements is formed of a generally rectangularly shaped structure having a constant thickness over its length. The illustrated configuration of these structures is merely illustrative. It should be understood that various configurations of these structures is within contemplation, e.g. circular and square, As further shown, the elements 26, 28, 30 and 32 are positioned sequentially approximately equal distances from the adjacent elements along the height of the shaft 24. This particular placement is preferred, although alternative placements involving nonequal spacing of the elements is also within contemplation.

Figure 2:
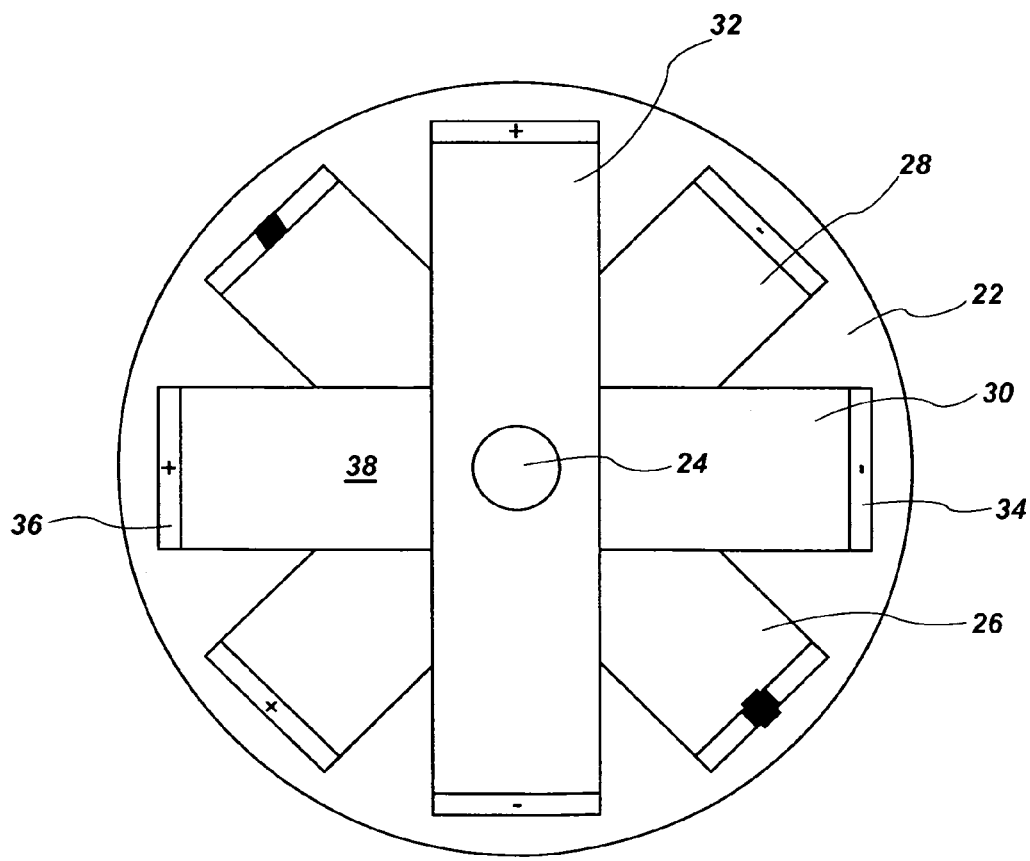
FIG. 2 is a top plan view of the rotor of FIG. 1 showing the orientation of the various elongate elements relative to one another.

Each of the first elements 26, 28, 30, and 32 is fitted on its opposing ends with a quantity of magnetically charged material 34 and 36. Each of these quantities of magnetically charged material has a polarity associated therewith. As shown in FIG. 2 in the instance of first element 30, a first end 34 has a negative polarity associated with it while the opposing end 36 has a positive polarity associated therewith. The other first elements 26, 28 and 30 have similar constructions to that of first element 32. As illustrated in FIG. 2, the various first elements 26, 28, 30 and 32 are arranged in pairs. First element 26 is associated with first element 28 while first element 30 is associated with first element 32. Within each pair of first elements, the longitudinal axis of one of the first elements is oriented at an angle of ninety degrees to the longitudinal axis of its corresponding paired first element.

The pairs of first elements are positioned adjacent to one another in spaced relationship as shown in FIG. 1. As illustrated in FIG. 2 the adjacently positioned first elements of two adjoining pairs of first elements are arranged such that the longitudinal axis of one of the first elements of the first pair is positioned at an angle of approximately forty five degrees from the longitudinal axis of an adjacently positioned first element of the second pair of first elements. For example, the longitudinal axis of first element 30, a first element of the pair of first elements formed by elements 30 and 32, is oriented at an angle of forty five degrees to the longitudinal axis of the first element 28, which is the adjacently positioned first element of an adjacently positioned second pair of first elements formed by first elements 26 and 28.

As further shown in FIG. 2, the polarities of the magnetic material attached to the first elements are arranged sequentially in a counterclockwise direction about the shaft 24. For example, the positive polarity of element 32 is followed, in a counterclockwise direction by the positive polarity of the element 30 positioned immediate below element 32. Similarity, the positive polarity of element 28 is positioned in a counterclockwise direction from the positive polarity of element 30. The positive polarity of element 26 is positioned in a counterclockwise orientation from the positive polarity of element 28. Similarly, the negative polarities are also arranged sequentially in a counterclockwise direction about the shaft 24. For example, the negative polarity of element 30 is positioned sequentially in a counterclockwise direction following the negative polarity of element 32. Similarity, the negative polarity of element 28 follows sequentially in a counterclockwise direction from the position of the negative polarity of first element 34. A similar orientation likewise is found between the orientation of the negative polarities of first elements 28 and 26.

A second rotor 20B having a configuration essentially identical to that of the above described first rotor 20A also forms part of the instant invention. This second rotor 20B is shown to advantage in FIG. 3. It should be understood that all of the features of the first rotor 20 also apply equally to the construction of the second rotor 20B. For purposes of clarity each of the structural elements of the second rotor will be referred to by the same nomenclature as used in the description of the first rotor with the exception that each such element will now be referenced as being a second element when referring to the second rotor. For example, the first element 28 of the first rotor 20A will correspondingly be referenced as the second element of second rotor 20B.

Figure 3:
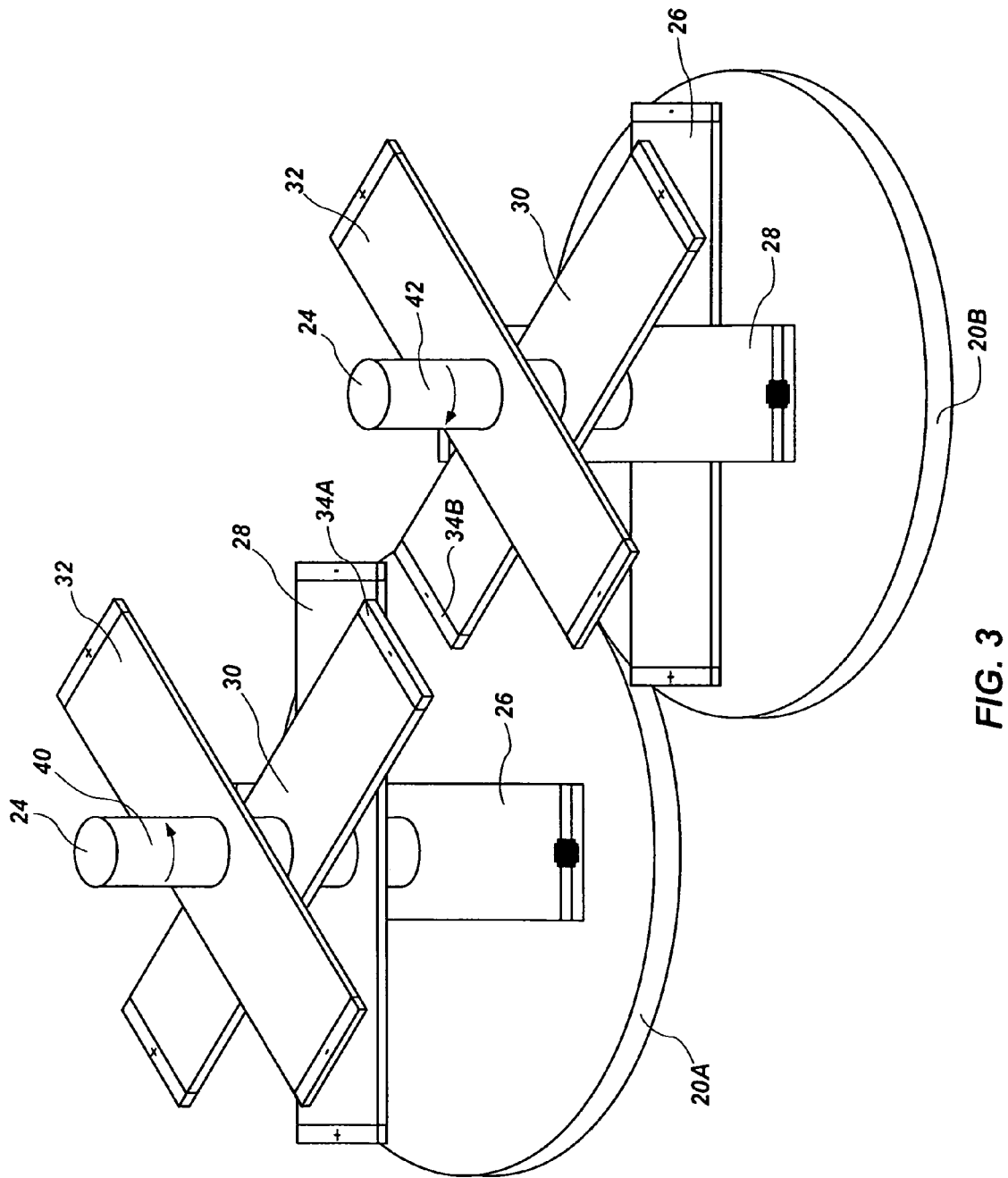
FIG. 3 is an elevated perspective view of a pair of elongate fitted rotor assemblies positioned proximate one another with each of the elongate elements of a first rotor being positioned in a co-planar relationship with a corresponding elongate element of a second rotor.

As shown in FIG. 3 the first rotor 20A is positioned sufficiently proximate the second rotor 20B such that the magnetic material positioned on the ends of the first element of the first rotor may interact with a second element of the second rotor to induce a rotation of at least one of the rotors about its respective axis of rotation. Each first element of the first rotor is positioned co-planarly with a corresponding second element of the second rotor. For example, first element 30 of the first rotor 20A is shown in a co-planar relationship with the second element 30 of the second rotor 20B.

In the construction shown in FIG. 3 each forty five degree rotation of the two rotors in the directions indicated by directional arrows 40 and 42 results in the ends of a pair of co-planarly positioned first and second elements being positioned adjacent from one another, with the polarities of those ends being of an identical polarity. The interaction of those two polarities induces a further rotation of the two rotors in the directions indicated.

The base elements 22 of each of the rotors may be fitted with structure adapted for transferring the kinetic energy associated with the motion of the rotors away from the rotors to an energy receiving device. For example, the perimeter of each base element 22 may be configured with gear teeth which are dimensioned and oriented to form drive gears for interacting with suitably configured gearing to function as a power takeoff.

Figure 4:
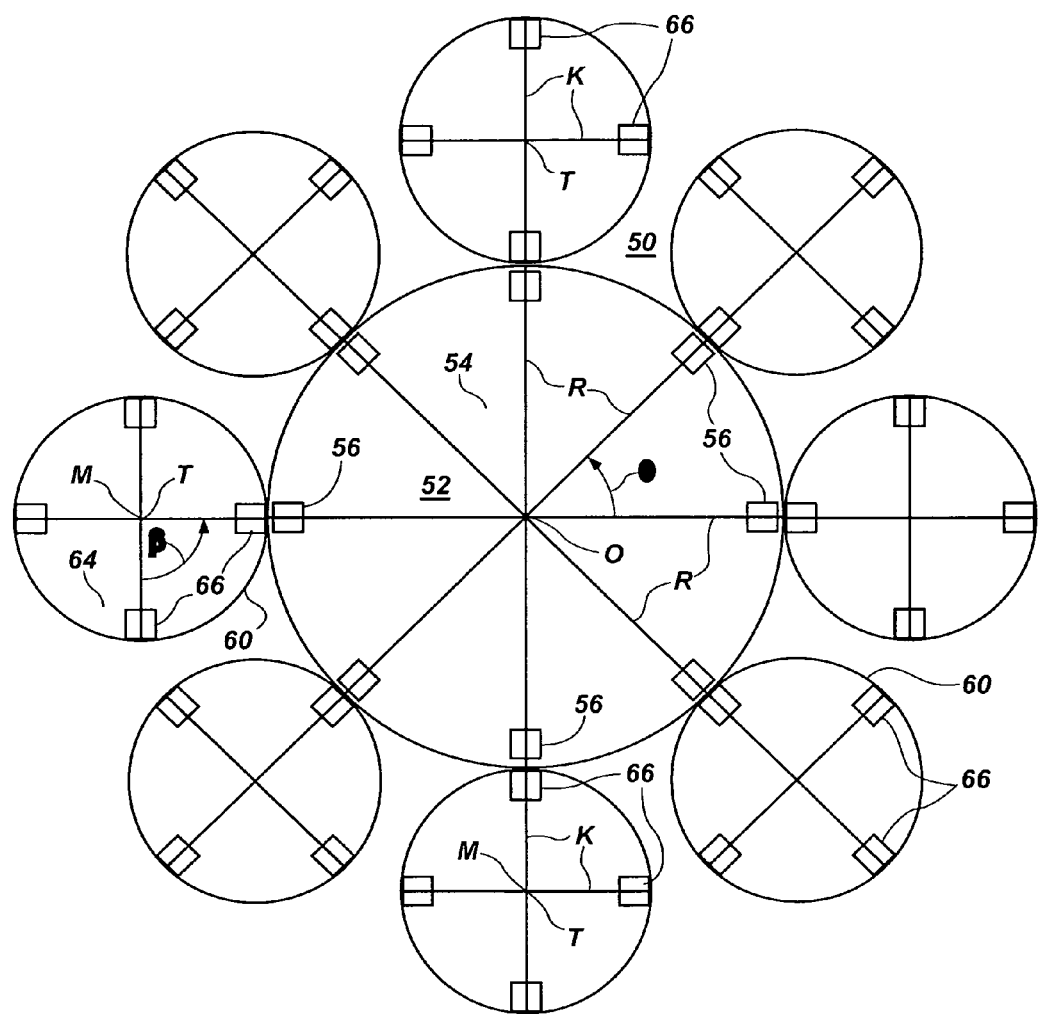
FIG. 4 is a schematic view of an alternative embodiment of the invention.

FIG. 4 illustrates an alternative embodiment of the invention. As shown, a central circular gear 50 having teeth positioned about its outer perimeter is rotatably mounted at its center 52. Secured on top of the gear 50 is a circular disk 54 which has a radius which is dimensionally almost as large as the radius of gear 50. Positioned spacedly about the perimeter of the disk 54 is a plurality of magnets 56. These magnets may be configured in a number of shapes, e.g. rectangular, circular, round, square, etc. In a preferred construction, the magnets are configured in a round shape. As illustrated, the magnets 56 are positioned at the end of a respective radius R which originates from the origin O of the disk 54. The radius R of each magnet is oriented at an angle θ from the R of each adjacent magnet. In a preferred construction, the angle θ has an angle measure of 45 degrees. Each magnet 56 has its positive pole oriented to face outwardly from the origin of the disk 54. Preferably, all of the magnets 56 have the same magnetic force associated therewith.

Positioned on the perimeter of the gear 50 is a plurality of smaller circular gears 60. Each of the gears 60 has teeth positioned about its perimeter. The teeth of the gears 60 are meshed with the teeth of gear 50 whereby a rotation of the gear 50 causes a responsive rotation of all of the gears 60. Each of the gears 60 is rotatably mounted to rotate about a center axis M. Secured to the upper surface of each gear 60 is a circular disk 62 having a planar upper surface 64. Secured to the upper surface 64 is a plurality of magnets 66. As shown the magnets 66 are arranged spacedly around the perimeter of the disk 66 whereby each magnet 66 is positioned diametrically opposite another magnet 66. Each of the magnets 66 is positioned at the end of a respective radius K which extends outwardly from the origin T of the disk. Each radius is oriented at an angle β from each of the adjacent radii. In a preferred construction the angle β has an angle measure of ninety degrees. The magnets 66 may be configured in a number of shapes, e.g. circular, round, rectangular, square, etc. In a preferred constructions the magnets are round in shape. Each of the magnets is positioned such that its positive pole is oriented outwardly from the origin T of the respective disk 62.

In a preferred construction the disk 54 and the disk 62 may be configured in a donut shape, i.e, having a circular ring which defines a circular void at its center. In one construction the diameter of the gear 50 is 4 inches while the diameter of the gears 60 is 2 inches. The magnets 56 measure $3/8$ inch in diameter and $1/2$ inch in length. The magnets 66 also measure $3/8$ inch in diameter and $1/2$ inch in length. This preferred construction provides a 2 to 1 ratio and allows the magnets on the 4 inch disk to come into alignment at just a slightly different time from the 2 inch disk. This in turn reduces the amount of resistance to bring all of the magnets into alignment without effecting the magnetic force which urges a separation of the respective opposing magnets.

It should be understood that the instant description is intended to be illustrative only in nature. The scope of the instant invention is limited solely by the claims directed to the invention which are appended hereto.

The invention claimed is:

1. A magnetic rotor device comprising:
a first rotor rotatably mounted to a first support structure for rotation about a first axis;
a plurality of first elongate magnetically charged elements secured to said first rotor spacedly along a length of said first rotor, each of said first elements having a first polarity on a first end thereof and a second polarity on a second end thereof;
a second rotor rotatably mounted to a second support structure for rotation about a second axis; and
a plurality of second elongate magnetically charged elements secured to said second rotor spacedly along a length of said second rotor; each of said second elements having said first polarity on a first end thereof and said second polarity on a second end thereof;
wherein each of said first elements is positioned coplanarly with a corresponding second element and
wherein each of said first elements is positioned sufficiently proximate said corresponding second element that a repulsive force created by the respective polarities of the proximate ends of said elements urges each of said rotors to rotate about its respective axis of rotation.

2. The rotor device of claim 1 wherein said first elements are arranged in pairs, one of said first elements being designated a primary first element and another of said first elements being designated a secondary first element, each said first element having a respective longitudinal axis, wherein the longitudinal axis of said primary first element is oriented ninety degrees from the longitudinal axis of said respective secondary first element.

3. The rotor device of claim 2 wherein said second elements are arranged in pairs, one said second elements being designated a primary second element and another said second element being designated a secondary second element, each said second element having a respective longitudinal axis, wherein the longitudinal axis of said primary second element is oriented ninety degrees from the longitudinal axis of said respective secondary second element.

4. The rotor device of claim 2 wherein a first said pair of first elements is positioned spatially proximate a second said pair of first elements along said length of said first rotor, said longitudinal axis of said primary first element of said first pair of first elements being oriented forty five degrees from said longitudinal axis of said primary first element of said second pair of first elements.

5. The rotor device of claim 2 wherein said second elements are arranged in pairs, one said second elements being designated a primary second element and another said second element being designated a secondary second element, each said second element having a respective longitudinal axis, wherein the longitudinal axis of said primary second element is oriented ninety degrees from the longitudinal axis of said respective secondary second element.

6. The rotor device of claim 5 wherein a first said pair of first elements is positioned spatially proximate a second said pair of first elements along said length of said first rotor, said longitudinal axis of said primary first element of said first pair of first elements being oriented forty five degrees from said longitudinal axis of said primary first element of said second pair of first elements.

7. The rotor device of claim 3 wherein said second elements are arranged in pairs, one said second elements being designated a primary second element and another said second element being designated a secondary second element, each said second element having a respective longitudinal axis, wherein the longitudinal axis of said primary second element is oriented ninety degrees from the longitudinal axis of said respective secondary second element.

8. The rotor device of claim 7 wherein a first said pair of first elements is positioned spatially proximate a second said pair of first elements along said length of said first rotor, said longitudinal axis of said primary first element of said first pair of first elements being oriented forty five degrees from said longitudinal axis of said primary first element of said second pair of first elements.

9. The rotor device of claim 4 wherein said second elements are arranged in pairs, one said second elements being designated a primary second element and another said second element being designated a secondary second element, each said second element having a respective longitudinal axis, wherein the longitudinal axis of said primary second element is oriented ninety degrees from the longitudinal axis of said respective secondary second element.

10. The rotor device of claim 1 wherein a first said pair of first elements is positioned spatially proximate a second said pair of first elements along said length of said first rotor, said longitudinal axis of said primary first element of said first pair of first elements being oriented forty five degrees from said longitudinal axis of said primary first element of said second pair of first elements.

11. The rotor device of claim 10 wherein said first rotor is mechanically associated with a structure for transferring kinetic energy from said first rotor to said structure.

12. The rotor device of claim 11 wherein said second rotor is mechanically associated with a second structure for transferring kinetic energy from said second rotor to said structure.

* * * * *